Oct. 26, 1926.     1,604,660
W. H. ROSS ET AL
PROCESS FOR THE SIMULTANEOUS RECOVERY OF NITRIC OXIDE AND THE PRODUCTION
OF ALKALI METAL NITRATE AND HYDROCHLORIC ACID
Filed Oct. 7, 1925     2 Sheets-Sheet 2
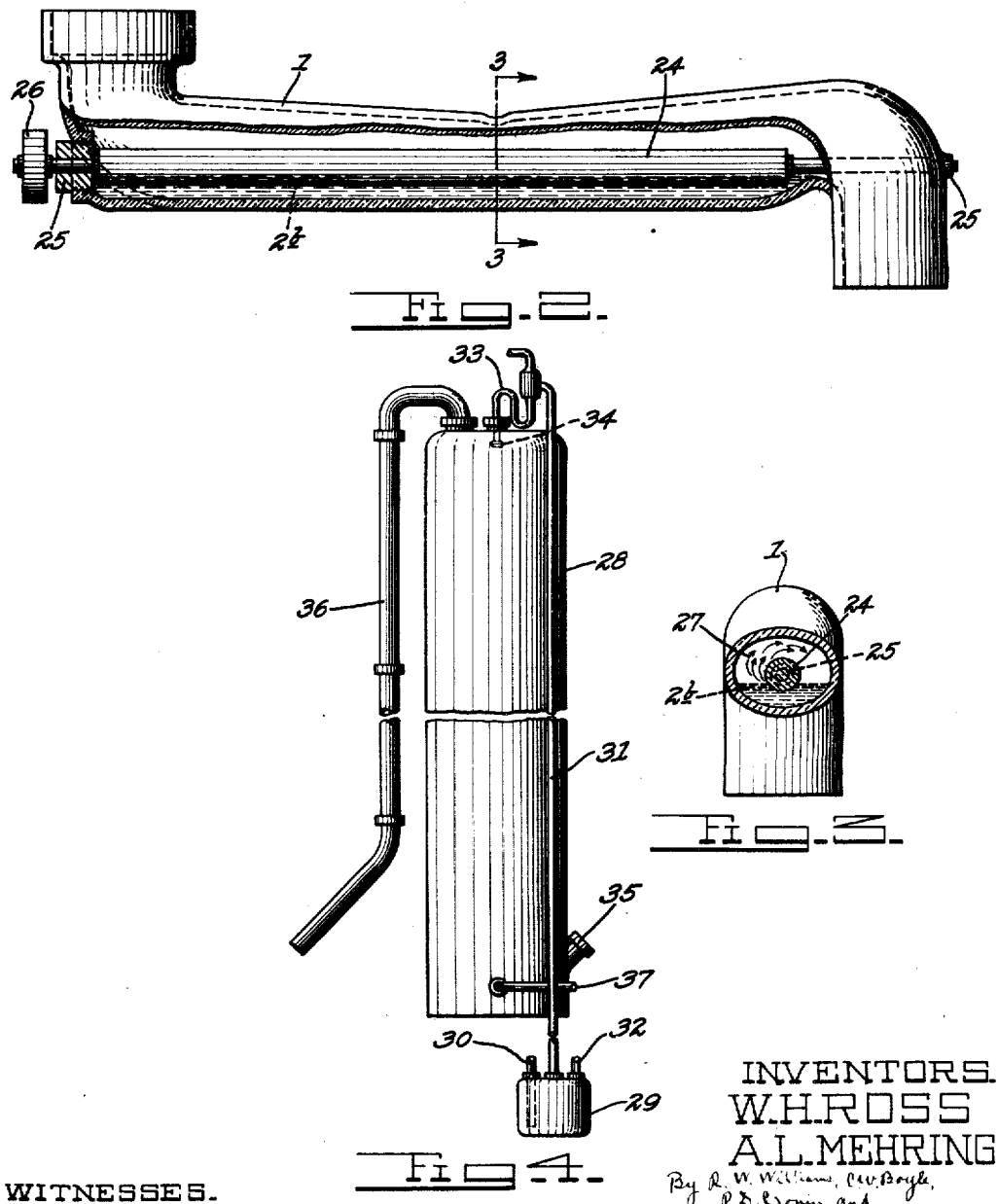
INVENTORS
W.H.ROSS
A.L.MEHRING
ATTORNEYS Patented Oct. 26, 1926.

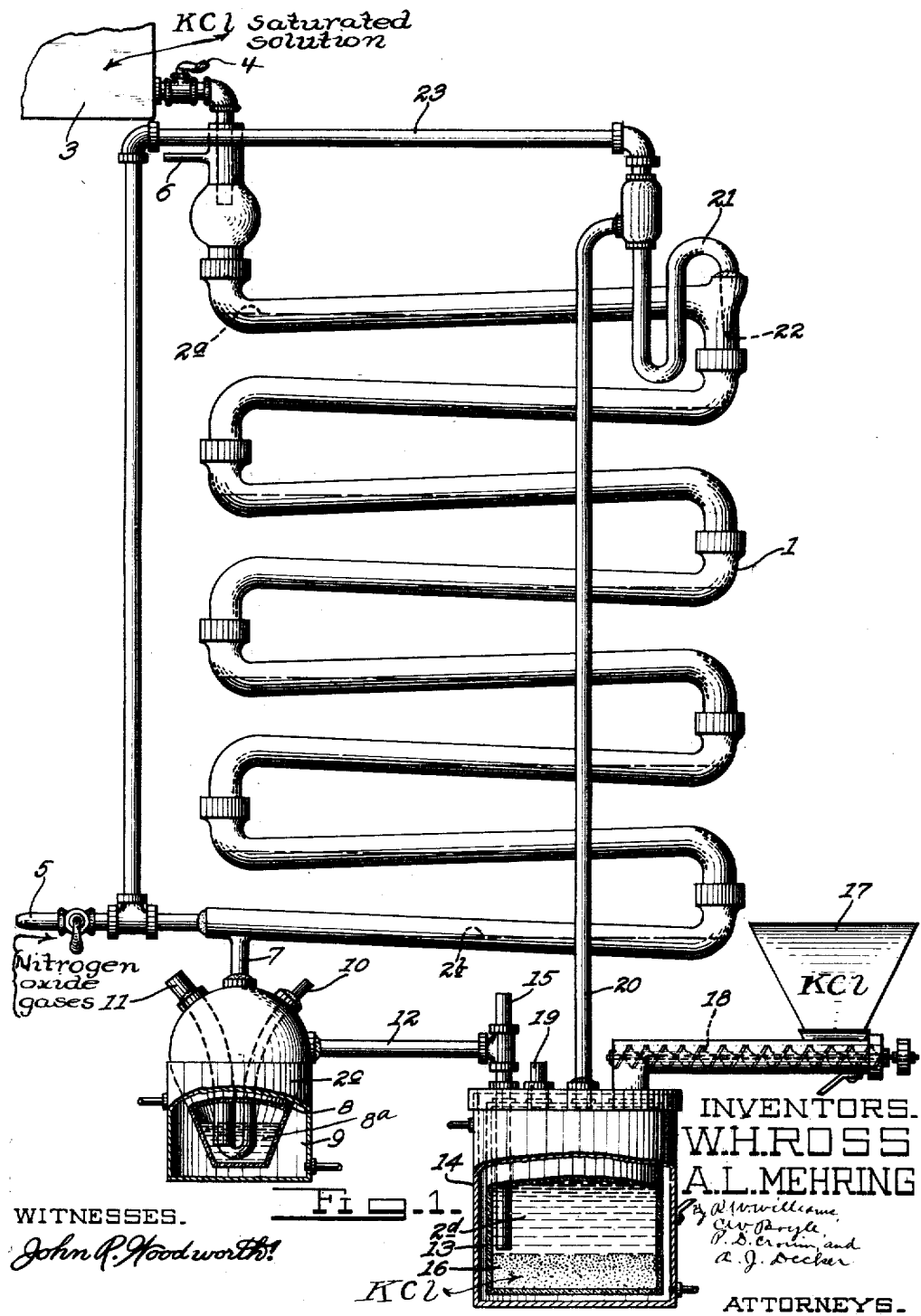

1,604,660

UNITED STATES PATENT OFFICE.

WILLIAM H. ROSS, OF WASHINGTON, DISTRICT OF COLUMBIA, AND ARNON L. MEHRING, OF HYATTSVILLE, MARYLAND.

PROCESS FOR THE SIMULTANEOUS RECOVERY OF NITRIC OXIDE AND THE PRODUCTION OF ALKALI-METAL NITRATE AND HYDROCHLORIC ACID.

Application filed October 7, 1925. Serial No. 61,043.

This invention relates to a process for the manufacture of an alkali nitrate, such as sodium or potassium nitrate, and also hydrochloric acid by subjecting the corresponding alkali-metal chloride to the action of nitrogen peroxide fumes as produced in the arc process of fixing nitrogen or in the oxidation of ammonia.

The principal objects of this invention are first to provide an economical and efficient method for the recovery of the nitric oxide fumes formed in the arc process of fixing nitrogen or in the oxidation of ammonia and second to produce a non-hygroscopic concentrated fertilizer material that is particularly adapted for use in the preparation of concentrated fertilizer mixtures.

The essential feature of the process of oxidizing ammonia consists in passing an ammonia-air mixture over a heated catalyst such as platinum gauze. When the conditions of the reactions are properly adjusted the ammonia combines with the oxygen of the air in passing through the catalyst to form nitric oxide and water. The gases are cooled as they leave the reaction chamber and, if sufficient oxygen is present, a second oxidation then occurs whereby the nitric oxide is changed to nitrogen peroxide. The gases diluted with nitrogen and containing an excess of air are then passed through a series of water absorption towers in which the nitrogen peroxide is absorbed and changed partly into nitric acid and partly into nitric oxide. The latter in turn combines with more oxygen in the air forming nitrogen peroxide which undergoes as before partial transformation into nitric acid. The acid recovered in this way when desired for use in fertilizers is neutralized with an alkali such as lime or ammonia to form calcium nitrate or ammonium nitrate. Unfortunately both of these salts are very hygroscropic which greatly interferes with and limits their use in fertilizers.

Our process offers an advantage over other processes in that the nitrogen peroxide may be recovered in the form of potassium nitrate which is the least hygroscopic of all the inorganic salts now used or suggested for use in fertilizers.

The nitrogenous materials so far produced in this country for use in fertilizers consist almost entirely of industrial by-products. The output of such products cannot be increased independently of the principal product and it is possible that their supply may fall far short of meeting future requirements in fertilizer manufacture. It is because of this possibility that so much attention is now being given to nitrogen fixation processes as a means of independently supplying future increased demands for nitrogen compounds.

The principal nitrogen fixation products are of a concentrated nature as regards their plant food constituents. Some of these as urea may be applied directly as fertilizers but others such as ammonia are entirely unsuited for direct use as a fertilizer. The product recovered in the volatilization processes now being developed for the more efficient utilization of our phosphate deposits is also unsuited for use in fertilizers in that it consists of a concentrated solution of phosphoric acid. By using ammonia for neutralizing this acid both products are converted into a fertilizer material which contains two of the three essential constituents of fertilizers and of such concentration that the content of both amounts to a total of 74 per cent.

Ammonium phosphate is thus one of the three compounds which represent combinations of the three essential fertilizer constituents taking two at a time. The other two are potassium phosphate and potassium nitrate. Complete fertilizers may be made by mixing any two or all three of these compounds and such mixtures are the most concentrated that can be prepared. The physical properties of these mixtures make them admirably suited for use as fertilizers and their transportation and handling costs are much less, by reason of their concentration, than for the ordinary mixed fertilizers.

The present process relates to the preparation of the third of these compounds by a process which combines the advantages (1) that use is made of a cheap raw material; (2) a valuable material is recovered as a by-product; and (3) means are provided for the direct recovery of nitric oxide fumes, as produced in the oxidation of ammonia, without the necessity of initially converting them into nitric acid as in the present practice of recovering these fumes.

For a better understanding of the invention reference is made to the accompanying drawings, but the invention is not restricted to the particular construction, arrangement or combination of parts illustrated in the drawings being capable of embodiment in varied forms and we therefore refer to the claims following this description for summaries of the essentials of the invention for which protection is desired.

In said drawings:

Fig. 1 represents a front elevation with some parts broken away of a form of apparatus which might be applied for carrying out the process.

Fig. 2 is a front elevational view with parts broken away of a modified form of the absorption unit shown in Fig. 1.

Fig. 3 is a cross section on the line 3—3 of the absorption unit shown in Fig. 2, and Fig. 4 is a front elevation of another modified form of absorption unit.

Referring to the drawings numeral 1 represents a series of S-bend absorption units constructed of silica, stone ware or other acid resistant material and of similar shape to that used in the recovery of hydrochloric acid. The units are suspended in a horizontal position one above the other and are so adjusted that a concentrated alkali-metal chloride solution $2^a$ which is allowed to flow by gravity from the reservoir 3 through the valve 4 into the absorption units about three-fourths fills the receiving end of each unit when it begins to flow out at the discharge end.

A gaseous stream of a nitrogen peroxide-air mixture is passed through the inlet 5 into the discharge end of the last of the absorption units while the gaseous products of the reaction escape through the outlet 6 into a hydrochloric acid absorption system not shown.

A gaseous stream of a nitrogen peroxide-air mixture is passed; absorbing system empties through the pipe 7 into the crystallizing vessel 8 which is similar in shape to the saturator used in the manufacture of ammonium sulfate. A cooling medium in the jacket 9 surrounding the vessel 8 promotes the deposition of salt crystals $8^a$ from the mother liquor $2^c$. A stream of air entering the pipe 10 continuously lifts the crystals $8^a$ as deposited through the pipe 11 onto a draining board (not shown) where they collect and are intermittently centrifuged by a centrifugal (not shown).

The accumulated mother liquor in the vessel 8 overflows through the pipe 12 into the vessel 13 which is surrounded by a steam or hot water jacket 14. The excess of mother liquor from draining board and centrifugal also drains into vessel 13 through the inlet 15. The vessel 13 serves in the double capacity of air lift and of dissolving chamber for increasing the alkali chloride content of the mother liquor by digesting in the latter the solid alkali-metal chloride 16 which is delivered from the storage bin 17 through the screw conveyor 18. Air supplied through the pipe 19, lifts the saturated solution $2^d$ through the pipe 20 into the trap 21 through which it is delivered through the inlet 22 into the receiving end of the second absorbing unit. The air used in the lift passes through the pipe 23 and on being mixed with the incoming nitrogen oxide gases serves to supply a portion of the oxygen required in the reactions taking place in the absorbing units.

In the operation of the process a saturated solution of an alkali chloride, such as potassium chloride, is allowed to flow at a regulated rate from the vessel 3 into the various units of the absorbing system. At the same time a mixture of nitric oxide, as produced in a nitrogen fixation or ammonia oxidation plant, and air in excess of that required to form nitrogen peroxide is passed into the apparatus at the discharge end of the last unit and is made to flow in a counter current direction over the saturated potassium chloride solution in the different absorption units. The reaction which takes place may be represented in two steps as follows:—

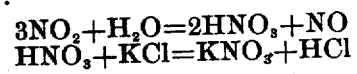

$$3NO_2+H_2O=2HNO_3+NO$$
$$HNO_3+KCl=KNO_3+HCl$$

The NO formed in the first reaction is re-oxidized by the oxygen in the air with which the gas is diluted and in turn repeats the above changes.

The stream of gas through the inlet 5 and the counter current flow of solution through the absorption units are so adjusted that no appreciable amount of nitrogen oxide escapes through the outlet 6 and one-half or more of the chlorine in the potassium nitrate solution is replaced by nitrate. The hydrochloric acid formed in the reaction escapes through the outlet 6 and serves as a valuable by-product when recovered by any suitable method well known in the arts.

As the solution resulting from the reaction flows into the vessel 8 it is cooled in the neighborhood of 5° C. or lower by a brine solution or other cooling medium flowing in the jacket surrounding the vessel. The cooling of the solution results in a crystallization of a large proportion of the postassium nitrate in solution owing to the lower solubility of this salt in cool solutions as compared with potassium chloride and to the extreme variation in the solubility of potassium nitrate in hot and cold solutions.

The crystals may be separated from the mother liquor by any preferred method such as that used in the preparation of ammonium sulfate. In this method the crystals are continuously pumped as formed by a stream of air onto a draining table and the drained crystals then centrifuged in the usual way. The excess mother liquor from the draining table and centrifuge and the overflow from the crystallizing vessel drain into the digesting vessel 13. The combined mother liquors are heated in this vessel to a temperature of 50°–100° C. by means of steam or hot water in the jacket surrounding the vessel and are again saturated with potassium chloride which is fed into the vessel as required through a suitable screw conveyor. As the solution becomes saturated an air lift returns it to the absorbing system through the receiving end of the second absorbing unit and the cycle thus repeated continuously during the operation of the process.

The saturated solution is returned to the second absorbing unit rather than the first in order that any nitrogen oxide fumes which may be evolved from the solution will be retained by the concentrated potassium chloride solution in the first unit.

In the first of the two equations given above it is seen that a molecule of water is required for every three molecules of nitrogen peroxide entering the absorbing units. This must be supplied to the system together with an amount equivalent to that which escapes as water vapor with the exit gases. In the present invention this is supplied in the form of a saturated potassium chloride solution which is fed into the absorbing units from the vessel 3. This saturated solution thus serves the double purpose of supplying the necessary water to the system and of serving as a means of preventing the escape of nitrogen oxide fumes from the absorbing units.

The air used in lifting the saturated solution from the vessel 13 to the second absorbing unit will be diluted with some nitrogen oxides and it should therefore be used after having served its purpose in lifting the solution in diluting the nitrogen peroxide entering the system. It is important however that the incoming nitrogen peroxide be still further diluted with sufficient air or oxygen from other sources to complete the various oxidation reactions involved in the formation of potassium nitrate from nitrogen peroxide.

The modified forms of absorbing units shown in Figs. 2, 3, and 4 afford a means for increasing the rate of absorption of the nitrogen peroxide in the concentrated potassium chloride solution by passing the gas through a spray of the solution rather than over its surface.

In the first of these modified units, as represented in Figs. 2 and 3, each unit is of the same general construction as that shown in Fig. 1, with the variation that a means is attached for converting the solution into a spray as it passes through the several absorbing units. In this way the rate of the reaction is increased by reason of the greatly increased solution surface exposed to the reacting gases.

The means for converting the solution into a spray may be of any suitable design. That represented in Figures 2 and 3 consists of a rotatable, horizontal cylinder 24 which dips slightly below the surface of the solution in the absorbing unit. The cylinder is supported by the bearings 25 and is provided with a pulley 26. On rotating the cylinder the portion of the solution which adheres to its lower surface is driven off by centrifugal force from the portion of the cylinder outside the solution, thus forming a spray 27 which fills the entire space within the absorbing unit.

The absorbing unit represented in Fig. 4 consists of a vertical stoneware tower 28. The alkali-metal chloride solution which drains from the preceding tower in the series flows into the air lift 29 through the inlet 30 and is elevated through the pipe 31 by a stream of air entering at 32 until it is discharged through the trap 33 and the nozzle 34 into the top of the tower in the form of a spray.

The nitrogen peroxide-air mixture enters the tower through the inlet 35 and rises countercurrently through the falling spray of alkali chloride solution. The residual gases resulting from the reaction of the initial gas mixture with the chloride solution escapes through the pipe 36 to the preceding tower in the series, while the solution containing the products of the reaction drain through the outlet 37 to the air lift of the following tower of the series. All other arrangements of parts may be the same as that represented in Fig. 1.

What we claim is:

1. A process for the manufacture of an alkali metal nitrate, comprising the bringing of a stream of a nitrogen peroxide-air mixture into contact with a solution of the corresponding alkali metal chloride.

2. A process for the manufacture of potassium nitrate, comprising the bringing of a stream of a nitrogen peroxide-air mixture into contact with a solution of potassium chloride.

3. A process for the preparation of an alkali metal nitrate which consists in passing a nitrogen peroxide-air mixture over a solution of the corresponding alkali metal chloride, cooling the resulting solution to crystallize out alkali metal nitrate, separating said alkali metal nitrate from its mother liquor, digesting said mother liquor at an elevated temperature with an additional amount of the same alkali metal chloride, and subjecting the resulting solution to the action of a nitrogen peroxide-air mixture to repeat the cycle.

4. A process for the preparation of an alkali metal nitrate which consists in passing a nitrogen peroxide-air mixture over a saturated solution of the corresponding alkali metal chloride, cooling the resulting solution to crystallize out alkali metal nitrate, separating said alkali metal nitrate from its mother liquor, resaturating said mother liquor with the same alkali metal chloride by digesting at an elevated temperature with an additional amount of the salt, and subjecting the resulting solution to the action of a nitrogen-peroxide air mixture to repeat the cycle.

5. A process for the preparation of potassium nitrate which consists in passing a nitrogen peroxide-air mixture over a saturated solution of potassium chloride, cooling the resulting solution to crystallize out potassium nitrate, separating said potassium nitrate from its mother liquor, resaturating said mother liquor with potassium chloride by digesting at an elevated temperature with an additional amount of the salt, and subjecting the resulting solution to the action of a nitrogen peroxide-air mixture to repeat the cycle.

6. A process for the simultaneous production of an alkali metal nitrate and hydrochloric acid which consists in passing a nitrogen peroxide-air mixture over a solution of the corresponding alkali metal chloride, cooling the resulting solution to crystallize out alkali metal nitrate, separating said alkali metal nitrate from its mother liquor, digesting said mother liquor at an elevated temperature with an additional amount of the same alkali metal chloride, and subjecting the resulting solution to the action of a nitrogen peroxide-air mixture to repeat the cycle.

7. A process for the simultaneous production of potassium nitrate and hydrochloric acid which consists in passing a nitrogen peroxide-air mixture over a solution of potassium chloride, cooling the resulting solution to crystallize out potassium nitrate, separating out said potassium nitrate from its mother liquor, digesting said mother liquor at an elevated temperature with an additional amount of potassium chloride, and subjecting the resulting solution to the action of a nitrogen peroxide-air mixture to repeat the cycle.

8. A continuous process for the preparation of an alkali metal nitrate which consists in passing a nitrogen peroxide-air mixture through a series of absorbing units in a countercurrent direction over a saturated solution of the correspnding alkali metal chloride, cooling the resulting solution as it issues from the first absorbing unit to a temperature of 5° C., or less, to crystallize out alkali metal nitrate, separating said alkali metal nitrate from its mother liquor, resaturating the said mother liquor with the same alkali metal chloride by digesting with an additional amount of the salt at a temperature of 50°–100° C., returning the resulting solution to an intermediate unit in the absorbing system to repeat the cycle, and continuously replacing the hydrogen lost from the system in the form of hydrochloric acid by the addition to the last absorbing unit of a fresh solution of the aforementioned alkali metal chloride.

9. A continuous process for the simultaneous production of an alkali metal nitrate and hydrochloric acid which consists in passing a nitrogen peroxide-air mixture through a series of absorbing units in a counter-current direction over a solution of an alkali metal chloride, cooling the resulting solution as it issues from the first absorbing unit to crystallize out alkali metal nitrate, separating said alkali metal nitrate from its mother liquor, digesting said mother liquor at an elevated temperature with an additional amount of the same alkali metal chloride, returning the resulting solution to an intermediate unit in the absorbing system to repeat the cycle, and continuously replacing the hydrogen which escapes from the system in the form of hydrochloric acid by the addition of a fresh solution of the aforementioned alkali metal chloride.

10. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction of over a saturated solution of an alkali metal chloride, cooling the resulting solution as it issues from the first absorbing unit to crystallize out alkali metal nitrate, separating said alkali metal nitrate from its mother liquor, resaturating said mother liquor with the same alkali metal chloride by digesting at an elevated temperature with an additional amount of the salt, returning the resulting solution to an intermediate unit in the absorbing system to repeat the cycle, and continuously replacing the hydrogen lost from the system in the form of hydrochloric acid by the addition to the last absorbing unit of a fresh solution of the aforementioned alkali metal chloride.

11. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction over a solution of potassium chloride, cooling the resulting solution as it issues from the first absorbing unit to crystallize out potassium nitrate, separating said potassium nitrate from its mother liquor, digesting said mother liquor at an elevated temperature with an additional amount of potassium chloride, returning the resulting solution to an intermediate unit in the absorbing system, to repeat the cycle, and continuously replacing the hydrogen lost from the system in the form of hydrochloric acid by the addition to the last absorbing unit of a fresh solution of potassium chloride.

12. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction over a saturated solution of potassium chloride, cooling the resulting solution as it issues from the first absorbing unit to a temperature of 5° C. or less, to crystallize out potassium nitrate, separating said potassium nitrate from its mother liquor, digesting said mother liquor with an additional amount of potassium chloride at a temperature of 50°–100° C., returning the resulting solution to an intermediate unit in the absorbing system to repeat the cycle, and continuously replacing the hydrogen lost from the system in the form of hydrochloric acid by the addition to the last absorbing unit of a fresh solution of potassium chloride.

13. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction over a saturated solution of potassium chloride, cooling the resulting solution as it issues from the first absorbing unit to crystallize out potassium nitrate, separating said potassium nitrate from its mother liquor, resaturating said mother liquor with potassium chloride by digesting at an elevated temperature with an additional amount of the salt, returning the resultant solution to an intermediate unit in the absorbing system to repeat the cycle, and continuously replacing the hydrogen lost from the system in the form of hydrochloric acid by the addition to the last absorbing unit of a fresh solution of potassium chloride.

WILLIAM H. ROSS.
ARNON L. MEHRING.

potassium chloride, cooling the resulting solution as it issues from the first absorbing unit to crystallize out potassium nitrate, separating said potassium nitrate from its mother liquor, digesting said mother liquor at an elevated temperature with an additional amount of potassium chloride, returning the resulting solution to an intermediate unit in the absorbing system, to repeat the cycle, and continuously replacing the hydrogen lost from the system in the form of hydrochloric acid by the addition to the last absorbing unit of a fresh solution of potassium chloride.

12. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction over a saturated solution of potassium chloride, cooling the resulting solution as it issues from the first absorbing unit to a temperature of 5° C. or less, to crystallize out potassium nitrate, separating said potassium nitrate from its mother liquor, digesting said mother liquor with an additional amount of potassium chloride at a temperature of 50°–100° C., returning the resulting solution to an intermediate unit in the absorbing system to repeat the cycle, and continuously replacing the hydrogen lost from the system in the form of hydrochloric acid by the addition to the last absorbing unit of a fresh solution of potassium chloride.

13. A continuous process for the recovery of nitric oxide produced in the arc process of fixing nitrogen, or in the oxidation of ammonia, by passing a mixture of said nitric oxide with air in excess of that required to change said nitric oxide to nitrogen peroxide through a series of absorbing units in a countercurrent direction over a saturated solution of potassium chloride, cooling the resulting solution as it issues from the first absorbing unit to crystallize out potassium nitrate, separating said potassium nitrate from its mother liquor, resaturating said mother liquor with potassium chloride by digesting at an elevated temperature with an additional amount of the salt, returning the resultant solution to an intermediate unit in the absorbing system to repeat the cycle, and continuously replacing the hydrogen lost from the system in the form of hydrochloric acid by the addition to the last absorbing unit of a fresh solution of potassium chloride.

WILLIAM H. ROSS.
ARNON L. MEHRING.

Certificate of Correction.

It is hereby certified that in Letters Patent No. 1,604,660, granted October 26, 1926, upon the application of William H. Ross, of Washington, District of Columbia, and Arnon L. Mehring, of Hyattsville, Maryland, for an improvement in "Processes for the Simultaneous Recovery of Nitric Oxide and the Production of Alkali-Metal Nitrate and Hydrochloric Acid," an error appears in the printed specification requiring correction as follows: Page 2, lines 43 and 44, strike out the words and semicolon "A gaseous stream of a nitrogen peroxide air mixture is passed;" and insert instead *The solution $2^b$ of the non-gaseous products of the reaction in the;* and that the said Letters Patent should be read with this correction therein that the same may conform to the record of the case in the Patent Office.

Signed and sealed this 14th day of December, A. D. 1926.

[SEAL.]

M. J. MOORE,
*Acting Commissioner of Patents.*

Certificate of Correction.

It is hereby certified that in Letters Patent No. 1,604,660, granted October 26, 1926, upon the application of William H. Ross, of Washington, District of Columbia, and Arnon L. Mehring, of Hyattsville, Maryland, for an improvement in "Processes for the Simultaneous Recovery of Nitric Oxide and the Production of Alkali-Metal Nitrate and Hydrochloric Acid," an error appears in the printed specification requiring correction as follows: Page 2, lines 43 and 44, strike out the words and semicolon "A gaseous stream of a nitrogen peroxide air mixture is passed;" and insert instead *The solution $2^b$ of the non-gaseous products of the reaction in the;* and that the said Letters Patent should be read with this correction therein that the same may conform to the record of the case in the Patent Office.

Signed and sealed this 14th day of December, A. D. 1926.

[SEAL.]
M. J. MOORE,
*Acting Commissioner of Patents.*